United States Patent
Johnson et al.

(10) Patent No.: US 9,124,930 B2
(45) Date of Patent: *Sep. 1, 2015

(54) IN-CIRCUIT SECURITY SYSTEM AND METHODS FOR CONTROLLING ACCESS TO AND USE OF SENSITIVE DATA

(71) Applicant: Apple Inc., Cupertino, CA (US)

(72) Inventors: Barry W. Johnson, Charlottesville, VA (US); Kristen R. O. Riemenschneider, Charlottesville, VA (US); David C. Russell, Virginia Beach, VA (US); Jonathan A. Tillack, Charlottesville, VA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,313

(22) Filed: Jul. 22, 2013

(65) Prior Publication Data

US 2013/0305056 A1 Nov. 14, 2013

Related U.S. Application Data

(60) Continuation of application No. 12/555,480, filed on Sep. 8, 2009, now Pat. No. 8,495,382, which is a division of application No. 10/858,287, filed on Jun. 1, 2004, now Pat. No. 7,587,611.

(60) Provisional application No. 60/474,750, filed on May 30, 2003.

(51) Int. Cl.
*G06F 21/75* (2013.01)
*H04N 21/4415* (2011.01)

(Continued)

(52) U.S. Cl.
CPC ............ *H04N 21/4415* (2013.01); *G06F 21/32* (2013.01); *G06F 21/6209* (2013.01);

(Continued)

(58) Field of Classification Search
None
See application file for complete search history.

(56) References Cited

U.S. PATENT DOCUMENTS

| 4,005,428 A | 1/1977 | Graham |
| 4,847,542 A | 7/1989 | Clark et al. |

(Continued)

FOREIGN PATENT DOCUMENTS

| JP | H09-54727 A | 2/1997 |
| JP | H10-307896 A | 11/1998 |

(Continued)

OTHER PUBLICATIONS

Office Action from Canadian Application No. 2,527,836, mailed on Nov. 6, 2008; 2 pages.

(Continued)

*Primary Examiner* — David Pearson
(74) *Attorney, Agent, or Firm* — Blakely, Sokoloff, Taylor & Zafman LLP

(57) ABSTRACT

The invention disclosed herein is an in-circuit security system for electronic devices. The in-circuit security system incorporates identity credential verification, secure data and instruction storage, and secure data transmission capabilities. It comprises a single semiconductor chip, and is secured using industry-established mechanisms for preventing information tampering or eavesdropping, such as the addition of oxygen reactive layers. This invention also incorporates means for establishing security settings, profiles, and responses for the in-circuit security system and enrolled individuals. The in-circuit security system can be used in a variety of electronic devices, including handheld computers, secure facility keys, vehicle operation/ignition systems, and digital rights management.

20 Claims, 2 Drawing Sheets

(51) Int. Cl.

| | | |
|---|---|---|
| G06F 21/32 | (2013.01) | |
| G06F 21/62 | (2013.01) | |
| G06F 21/85 | (2013.01) | |
| G06K 9/00 | (2006.01) | |
| H04L 29/06 | (2006.01) | |
| H04L 9/32 | (2006.01) | |
| H04N 21/258 | (2011.01) | |

(52) U.S. Cl.
CPC .......... *G06F21/75* (2013.01); *G06F 21/85* (2013.01); *G06K 9/00013* (2013.01); *H04L 9/3231* (2013.01); *H04L 63/0823* (2013.01); *H04N 21/25875* (2013.01)

(56) References Cited

U.S. PATENT DOCUMENTS

| | | |
|---|---|---|
| 4,993,068 A | 2/1991 | Piosenka et al. |
| 5,053,608 A | 10/1991 | Senanayake |
| 5,131,038 A | 7/1992 | Puhl et al. |
| 5,189,700 A | 2/1993 | Blandford |
| 5,280,527 A | 1/1994 | Gullman et al. |
| 5,396,215 A | 3/1995 | Hinkle |
| 5,448,045 A | 9/1995 | Clark |
| 5,469,506 A | 11/1995 | Berson et al. |
| 5,473,318 A | 12/1995 | Martel |
| 5,481,265 A | 1/1996 | Russell |
| 5,489,095 A | 2/1996 | Goudard et al. |
| 5,495,235 A | 2/1996 | Durinovic-Johri et al. |
| 5,526,428 A | 6/1996 | Arnold |
| 5,533,123 A | 7/1996 | Force et al. |
| 5,559,505 A | 9/1996 | McNair |
| 5,591,949 A | 1/1997 | Bernstein |
| 5,613,012 A | 3/1997 | Hoffman et al. |
| 5,615,277 A | 3/1997 | Hoffman |
| 5,721,583 A | 2/1998 | Harada et al. |
| 5,721,777 A | 2/1998 | Blaze |
| 5,729,220 A | 3/1998 | Russell |
| 5,805,719 A | 9/1998 | Pare, Jr. et al. |
| 5,825,878 A | 10/1998 | Takahashi et al. |
| 5,832,207 A | 11/1998 | Little et al. |
| 5,838,812 A | 11/1998 | Pare, Jr. et al. |
| 5,870,723 A | 2/1999 | Pare, Jr. et al. |
| 5,894,550 A | 4/1999 | Thiriet |
| 5,900,867 A | 5/1999 | Schindler et al. |
| 5,920,640 A | 7/1999 | Salatino et al. |
| 5,952,641 A | 9/1999 | Korshun |
| 5,991,408 A | 11/1999 | Pearson et al. |
| 6,038,666 A | 3/2000 | Hsu et al. |
| 6,041,410 A | 3/2000 | Hsu et al. |
| 6,084,968 A | 7/2000 | Kennedy et al. |
| 6,101,477 A | 8/2000 | Hohle et al. |
| 6,119,096 A | 9/2000 | Mann et al. |
| 6,154,879 A | 11/2000 | Pare, Jr. et al. |
| 6,167,517 A | 12/2000 | Gilchrist et al. |
| 6,173,400 B1 | 1/2001 | Perlman et al. |
| 6,181,803 B1 | 1/2001 | Davis |
| 6,182,221 B1 | 1/2001 | Hsu et al. |
| 6,185,316 B1 | 2/2001 | Buffam |
| 6,199,044 B1 | 3/2001 | Ackley et al. |
| 6,201,484 B1 | 3/2001 | Russell |
| 6,219,793 B1 | 4/2001 | Li et al. |
| 6,268,788 B1 | 7/2001 | Gray |
| 6,282,648 B1 | 8/2001 | Walker et al. |
| 6,282,649 B1 | 8/2001 | Lambert et al. |
| 6,317,834 B1 | 11/2001 | Gennaro et al. |
| 6,327,376 B1 | 12/2001 | Harkin |
| 6,335,688 B1 | 1/2002 | Sweatte |
| 6,353,889 B1 | 3/2002 | Hollingshead |
| 6,366,682 B1 | 4/2002 | Hoffman et al. |
| 6,367,017 B1 | 4/2002 | Gray |
| 6,369,693 B1 | 4/2002 | Gibson |
| 6,396,544 B1 | 5/2002 | Schindler et al. |
| 6,424,285 B1 | 7/2002 | Perdue et al. |
| 6,441,770 B2 | 8/2002 | Russell |
| 6,466,781 B1 | 10/2002 | Bromba et al. |
| 6,484,260 B1 | 11/2002 | Scott et al. |
| 6,487,662 B1 | 11/2002 | Kharon et al. |
| 6,490,680 B1 | 12/2002 | Scheidt et al. |
| 6,529,885 B1 | 3/2003 | Johnson |
| 6,532,298 B1 | 3/2003 | Cambier et al. |
| 6,581,161 B1 | 6/2003 | Byford |
| 6,609,198 B1 | 8/2003 | Wood et al. |
| 6,615,264 B1 | 9/2003 | Stoltz et al. |
| 6,618,806 B1 | 9/2003 | Brown et al. |
| 6,636,973 B1 | 10/2003 | Novoa et al. |
| 6,657,538 B1 | 12/2003 | Ritter |
| 6,662,166 B2 | 12/2003 | Pare, Jr. et al. |
| 6,668,332 B1 | 12/2003 | McNeil |
| 6,671,808 B1 | 12/2003 | Abbott et al. |
| 6,681,034 B1 | 1/2004 | Russo |
| 6,711,263 B1 | 3/2004 | Nordenstam et al. |
| 6,719,200 B1 | 4/2004 | Wiebe |
| 6,728,881 B1 | 4/2004 | Karamchetty |
| 6,735,695 B1 | 5/2004 | Gopalakrishnan et al. |
| 6,751,734 B1 | 6/2004 | Uchida |
| 6,757,411 B2 | 6/2004 | Chau |
| 6,765,470 B2 | 7/2004 | Shinzaki |
| 6,766,040 B1 | 7/2004 | Catalano et al. |
| 6,775,776 B1 | 8/2004 | Vogt et al. |
| 6,786,397 B2 | 9/2004 | Silverbrook et al. |
| 6,819,219 B1 | 11/2004 | Bolle et al. |
| 6,832,317 B1 | 12/2004 | Strongin et al. |
| 6,836,843 B2 | 12/2004 | Seroussi et al. |
| 6,839,688 B2 | 1/2005 | Drummond et al. |
| 6,844,660 B2 | 1/2005 | Scott |
| 6,848,052 B2 | 1/2005 | Hamid et al. |
| 6,850,147 B2 | 2/2005 | Prokoski et al. |
| 6,850,252 B1 | 2/2005 | Hoffberg |
| 6,853,739 B2 | 2/2005 | Kyle |
| 6,857,073 B2 | 2/2005 | French et al. |
| 6,862,443 B2 | 3/2005 | Witte |
| 6,870,946 B1 | 3/2005 | Teng et al. |
| 6,870,966 B1 | 3/2005 | Silverbrook et al. |
| 6,871,193 B1 | 3/2005 | Campbell et al. |
| 6,871,287 B1 | 3/2005 | Ellingson |
| 6,871,784 B2 | 3/2005 | Jayaratne |
| 6,876,757 B2 | 4/2005 | Yau et al. |
| 6,877,097 B2 | 4/2005 | Hamid et al. |
| 6,879,243 B1 | 4/2005 | Booth et al. |
| 6,879,966 B1 | 4/2005 | Lapsley et al. |
| 6,880,749 B1 | 4/2005 | Green et al. |
| 6,880,750 B2 | 4/2005 | Pentel |
| 6,883,709 B2 | 4/2005 | Joseph |
| 6,886,096 B2 | 4/2005 | Appenzeller et al. |
| 6,886,101 B2 | 4/2005 | Glazer et al. |
| 6,886,104 B1 | 4/2005 | McClurg et al. |
| 6,888,445 B2 | 5/2005 | Gotfried et al. |
| 6,898,577 B1 | 5/2005 | Johnson |
| 6,901,154 B2 | 5/2005 | Dunn |
| 6,901,155 B2 | 5/2005 | Xia et al. |
| 6,901,266 B2 | 5/2005 | Henderson |
| 6,901,382 B1 | 5/2005 | Richards et al. |
| 6,940,391 B1 | 9/2005 | Ishikura et al. |
| 6,985,502 B2 | 1/2006 | Bunton |
| 7,076,663 B2 | 7/2006 | Kelley et al. |
| 7,076,802 B2 | 7/2006 | Poisner |
| 7,079,652 B1 | 7/2006 | Harris |
| 7,188,362 B2 | 3/2007 | Brandys |
| 7,204,425 B2 | 4/2007 | Mosher, Jr. et al. |
| 7,255,269 B2 | 8/2007 | Debelleix |
| 7,587,611 B2 | 9/2009 | Johnson et al. |
| 8,495,382 B2 | 7/2013 | Johnson et al. |
| 2001/0011353 A1 | 8/2001 | Little et al. |
| 2001/0015919 A1 | 8/2001 | Kean |
| 2002/0013898 A1 | 1/2002 | Sudia et al. |
| 2002/0104872 A1 | 8/2002 | DeFelice et al. |
| 2002/0167394 A1 | 11/2002 | Couillard |
| 2002/0186838 A1 | 12/2002 | Brandys |
| 2003/0041246 A1 | 2/2003 | Fischer |
| 2003/0046554 A1 | 3/2003 | Leydier et al. |
| 2003/0054879 A1 | 3/2003 | Schneier et al. |
| 2003/0140232 A1 | 7/2003 | De Lanauze |
| 2003/0182570 A1 | 9/2003 | Dellow |

(56) References Cited

U.S. PATENT DOCUMENTS

| | | |
|---|---|---|
| 2003/0200453 A1 | 10/2003 | Foster et al. |
| 2004/0005059 A1 | 1/2004 | Suzuki et al. |
| 2004/0054899 A1 | 3/2004 | Balfanz et al. |
| 2004/0123113 A1 | 6/2004 | Mathiassen et al. |

FOREIGN PATENT DOCUMENTS

| | | |
|---|---|---|
| JP | H10-340254 A | 12/1998 |
| JP | 2000-83019 | 3/2000 |
| JP | 2001-103046 | 4/2001 |
| WO | WO 00/07326 A1 | 2/2000 |
| WO | WO 01/41032 A1 | 6/2001 |
| WO | WO 01/71671 | 9/2001 |

OTHER PUBLICATIONS

Office Action for Canadian Application No. 2,527,836, mailed on Oct. 5, 2009, 2 pages.
U.S. Appl. No. 60/395,361, filed Jul. 12, 2002, Johnson et al.
Microsoft Computer Dictionary, Fifth Edition, 2002, pp. 99, 277, and 485.
Microsoft Computer Dictionary, Microsoft Press 2002, Fifth Edition. "Disable" Definition; 4 pages.
Office Action for U.S. Appl. No. 10/858,287, mailed Jun. 26, 2007.
Final Office Action for U.S. Appl. No. 10/858,287, mailed Dec. 10, 2007.
Office Action for U.S. Appl. No. 10/858,287, mailed Jul. 22, 2008.
Final Office Action for U.S. Appl. No. 10/858,287, mailed Jan. 16, 2009.
Office Action for U.S. Appl. No. 12/555,480, dated Sep. 9, 2010.
Office Action for U.S. Appl. No. 12/555,480, dated May 26, 2011.
Office Action for U.S. Appl. No. 13/947,313, dated Jun. 18, 2014.
International Search Report and Written Opinion for PCT/US04/17272, mailed on Dec. 6, 2004, 4 pages.
Supplementary European Search Report for EP 04 75 3980, mailed on Jan. 23, 2009, 3 pages.
Office Action for European Patent Application No. EP 04 75 3980, mailed on May 14, 2009; 4 pages.
Office Action for European Patent Application No. EP 04 75 3980, mailed on Nov. 27, 2009, 5 pages.
Office Action for European Patent Application No. EP 04 75 3980, mailed on Feb. 23, 2012, 3 pages.
Office Action for Japanese Patent Application No. 2006-533548, mailed on Nov. 17, 2009.
Office Action for Japanese Patent Application No. 2006-533548, mailed on Oct. 5, 2010.
Office Action for Canadian Application No. 2,724,292, mailed on Apr. 30, 2013, 4 pages.
Office Action for Japanese Patent Application No. 2010-113165, mailed on Sep. 29, 2011, 9 pages.

IN-CIRCUIT SECURITY SYSTEM AND METHODS FOR CONTROLLING ACCESS TO AND USE OF SENSITIVE DATA

RELATED U.S. APPLICATION DATA

This application is a continuation of U.S. patent application Ser. No. 12/555,480 (now U.S. Pat. No. 8,495,382), filed Sep. 8, 2009, entitled "An In-Circuit Security System And Methods For Controlling Access To And Use Of Sensitive Data," which is a divisional of U.S. patent application Ser. No. 10/858,287 (now U.S. Pat. No. 7,587,611), filed Jun. 1, 2004, entitled "An In-Circuit Security System And Methods For Controlling Access To And Use Of Sensitive Data," which claims priority under U.S.C. §119(e) of provisional patent application Ser. No. 60/474,750, filed May 30, 2003, entitled "Secure Biometric Identification Devices and Systems for Various Applications," each of which is hereby incorporated by reference in its entirety.

BACKGROUND OF THE INVENTION

1. Field of the Invention

The invention disclosed herein relates to the security of sensitive data stored, processed and distributed using electronic circuits. More particularly, the invention relates to the identification of individuals prior to accessing/using data, and the execution of security controls upon unauthorized attempts to access/use said data.

In recent years there has been an explosion of electronic devices that individuals may use for storing and transmitting sensitive data. In a low-security example, portable devices like a Palm™ or BlackBerry handheld computer typically contain software for e-mail, along with options for storing credit cards, schedules, and other data. Most people wish to protect this information, but most handheld devices rely on their operating system to secure data. Unfortunately, the most common operating systems for these handheld computers were not designed with security as the main goal, and retrofitting basic security mechanisms has been clumsy.

A growing number of electronic devices, such as smart cards, are intended to specifically identify and authenticate users using the public key infrastructure, which requires secure storage of private keys. These devices are common in building security; for example, an individual with proper authorization to access a facility is assigned a smart card and an asymmetric key pair. A certificate authority generates a digital certificate for the public key, which is stored in the smart card. The private key is also stored on the smart card. When the individual places his smart card in the reader at the access point of the facility, the card transmits its digital certificate, and the reader challenges the card to encrypt a supplied string with the individual's private key. The reader obtains the public key out of the digital certificate and decrypts the private key-encrypted string to verify that the keys are related. This has an inherent problem because there is no guarantee that the individual using the private key is the assigned owner of the smart card. Furthermore, it is fairly simple for an experienced attacker to gain access to keys stored on the card.

Some handheld devices, such as Hewlett Packard's iPAQ PocketPC h5450, include biometric sensors for improved personal identification before allowing access to sensitive data. An individual possessing this device is instructed to enroll one or more of his fingerprints into the device's software. The enrolled fingerprint can be used as the sole password or as an alternative to a typed password. This type of device can be a substantial improvement on traditional data-access methods, because the biometric can be definitively tied to a single individual. However, if the sensitive data is stored or transmitted insecurely, the biometric authentication does not substantially hinder an attacker from probing the memory and compromising it.

These concerns have contributed to the marketing of products billed as 'secure memory' or 'secure processor'. These products are typically constructed with varying degrees of security; one lower degree is considered 'tamper-evident', in which an unskilled observer would see that someone had attempted to maliciously gain access to secured data. A higher level is 'tamper-resistant', in which the product actively resists tampering by use of a self-destruct mechanism, an impermeable substance that coats the components storing sensitive data such as a polymer-based coating or other so-called "conformal coating", or some other process. Furthermore, these products may encrypt input/output lines, mislabel parts, and perform other types of obfuscation.

2. Description of the Related Art

U.S. Pat. No. 5,533,123 to Force, et al., discloses programmable distributed personal security inventions. The patent teaches a "Secured Processing Unit" ("SPU") comprising an "SPU chip" and a microprocessor designed especially for secure data processing. The invention integrates keys, encryption and decryption engines, and algorithms in the SPU of the invention. Purportedly, the security process is portable and easily distributed across physical boundaries. The invention is based upon three interdependent subsystems. The first subsystem of the invention is a detector subsystem, which alerts an SPU to the existence and to the character of a security attack. A second subsystem is a filter subsystem that correlates data from multiple detectors, then assesses the severity of the attack against the risk to the SPU's integrity, both to its secret data and to the design of the SPU itself. A third subsystem is a response subsystem for generating responses, or countermeasures, calculated by the filters to be most appropriate under the circumstances, in order to deal with the attack(s) detected. Force does not disclose identity credential verification within the SPU.

U.S. Pat. No. 5,825,878 to Takahashi discloses a secure embedded memory management unit for a microprocessor. A microprocessor memory management apparatus is used for encrypted instruction and data transfer from an external memory. Physical security is obtained by embedding the direct memory access controller on the same chip with a microprocessor core, an internal memory, and encryption/decryption logic. Data transfer to and from an external memory takes place between the external memory and the memory controller of the memory management unit. All firmware to and from the external memory is handled on a page-by-page basis. Since all of the processing takes place on buses internal to the chip, detection of clear unencrypted instructions and data is prevented. Takahashi does not disclose any capability, anticipation, intention, or provision for including identity credential verification on the management unit or within the microprocessor core.

U.S. Pat. No. 5,832,207 to Little, et al., teaches a secure module including a microprocessor and a co-processor. The electronic module is provided with at least one microprocessor and a co-processor deployed into a single integrated circuit. The electronic module can be contained in a small form factor housing. The electronic module provides secure bi-directional data communication via a data bus. The electronic module may include an integrated circuit including a microprocessor and a co-processor adapted to handle 1,024-bit modulo mathematics primarily aimed at RSA calculations.

The electronic module is preferably contained in a small token-sized metallic container. The module preferably communicates via a single wire data bus using a one-wire protocol. Little et al. does not disclose personal identification systems.

U.S. Pat. No. 5,894,550 to Thireit discloses a method of implementing a secure program in a microprocessor card, and a microprocessor card including a secure program. The invention claims that a program can be made secure relative to a CPU. The invention accomplishes this by storing in a first memory zone predetermined address functions that are directly executable by the CPU. The first memory zone is then write-protected, then the program is stored in a second memory zone in the form of a series of instructions that are executable within the second memory zone or that activate functions contained in the first memory zone.

U.S. Pat. Nos. 5,481,265, 5,729,220, 6,201,484 and 6,441,770 to Russell detail a handheld device used to authenticate persons and said device to remote computer systems. The invention further includes a "kill switch" or "kill signal" enabling the computer system to remotely disable the handheld device and restrict further emissions. However, the system is primarily targeted at local area network applications and does not anticipate or suggestion broader applications.

BRIEF SUMMARY OF THE INVENTION

The invention disclosed herein is an in-circuit security system for electronic devices. The in-circuit security system incorporates identity credential verification, secure data and instruction storage, and secure data transmission capabilities. It comprises a single semiconductor chip, lowering component cost and reducing board space. The in-circuit security system chip is secured using mechanisms for preventing information tampering or eavesdropping, such as the addition of oxygen reactive layers. This invention also incorporates means for establishing security settings and profiles for the in-circuit security system and enrolled individuals. The in-circuit security system can be used in a variety of electronic devices, including handheld computers, secure facility keys, vehicle operation/ignition systems, and digital rights management.

BRIEF DESCRIPTION OF DRAWINGS

Master Reference Numeral List

FIG. 1 is a schematic view of a sample embodiment of the in-circuit security system.

FIG. 2 is a schematic view of the components of a sample handheld computer using the in-circuit security system.

FIG. 3 is a schematic view of the components of an electronic lock mechanism using the in-circuit security system.

DETAILED DESCRIPTION OF THE INVENTION

The invention described herein is an in-circuit security system by which pre-enrolled individuals may access sensitive data or perform actions on sensitive data in an environment that is fully monitored and protected. The in-circuit security system requires full authentication of individuals and can perform a variety of programmed responses in the event that pre-established authentication standards are not met. The in-circuit security system includes secure transmission of sensitive data to remote devices.

Figure 1:
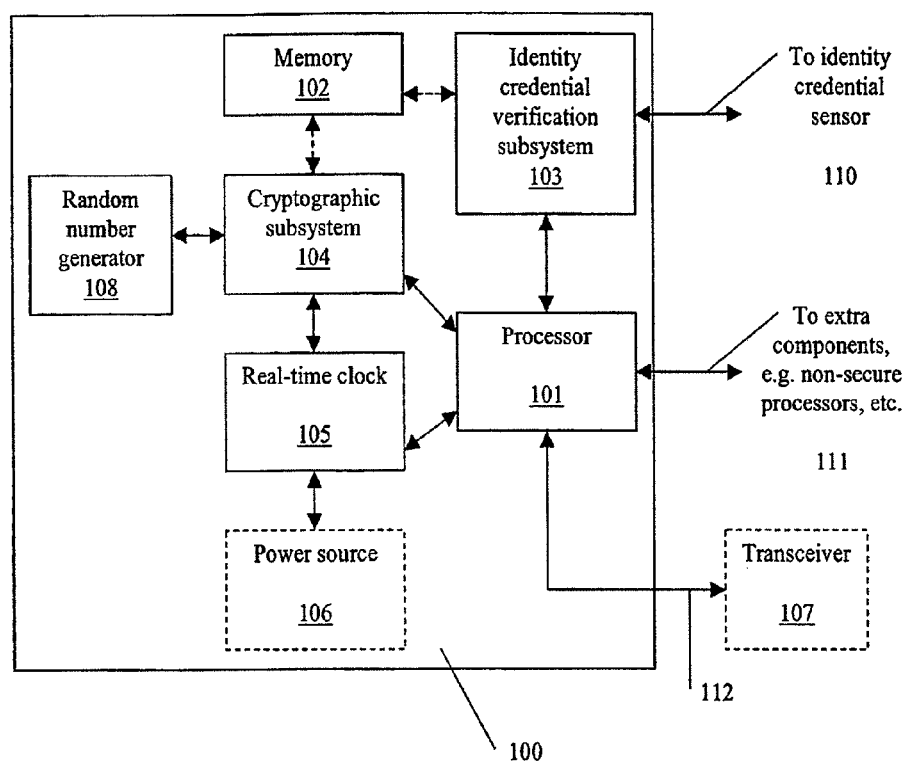
FIG. 1: Sample embodiment of in-circuit security system components
  100 In-circuit security system
  101 Processor
  102 Memory
  103 Identity credential verification subsystem
  104 Cryptographic subsystem
  105 Real-time clock
  106 Power source (OPTIONAL)
  107 Transceiver (OPTIONAL)
  108 Random number generator
  110 Connection to identity credential sensor
  111 Connection to peripheral components
  112 Connection to antenna or cables

The in-circuit security system comprises several components combined securely into a single, secure chip. As seen in FIG. 1, the primary embodiment of the in-circuit security system 100 comprises a processor 101, a memory 102, a real-time clock 105, and a random number generator 108. The in-circuit security system 100 also includes a cryptographic subsystem 104 and an identity credential verification subsystem 103. These subsystems may be logical, physical, or some combination thereof, and are described in further detail below. In typical embodiments, the in-circuit security system 100 will also contain a power source 106, such as a battery, in order to maintain power to the real-time clock 105. During manufacture, the in-circuit security system 100 receives a unique, one-time programmable electronic identification code that can be read but cannot be altered or removed. The in-circuit security system 100 also preferably provides multiple input/output interfaces 110-112 for connection to optional internal/external components, such as transceivers 107, antennae, identity credential sensors, non-secure processors, etc.

The processor 101 is the main control component; it is responsible for loading and executing instructions to control the various components of the chip, as well as performing user-requested tasks. The memory 102 is coupled to the processor 101. It comprises both volatile and non-volatile components and can be used to store instructions or data, such as security settings or profiles and cryptographic keys. The application of these security settings is discussed below. The real-time clock 105 is also coupled to the processor 101 and is used to maintain an accurate time, which can be used in cryptographic signing, audit records, or other transactions. The real-time clock 105 may be connected to a power source 106 in order to constantly maintain time. If the in-circuit security system 100 does not include the power source 106, the real-time clock 105 must be cognizant of power disconnects, which means that it can no longer provide an accurate time.

The fourth component of the in-circuit security system 100 is a random number generator 108. The random number generator 108 is used for seeding cryptographic algorithms, and may use any of established methods for guaranteeing sufficient randomness. The random number generator 108 may be included as part of the cryptographic subsystem 104 or may be a standalone component coupled to the subsystem 104. The cryptographic subsystem 104 is a dedicated system for performing encryption and decryption, digital signing and digital signature verification. In one embodiment the subsystem 104 is responsible for storing cryptographic keys in its own memory; in another, the subsystem is coupled to and uses the main memory 102 of the in-circuit security system 100. Additionally, one primary embodiment of the invention uses a cryptographic acceleration chip or component as the cryptographic subsystem 104. Alternative embodiments are coupled to and use the main processor 101 as the cryptographic engine.

The identity credential verification subsystem 103 is used to determine the identity of an individual attempting to use the in-circuit security system 100 and identify his associated security privileges. The identity credential verification subsystem 103 performs identity credential acquisition, analysis, storage and matching. In the primary embodiment of the invention, the identity credential verification subsystem 103 uses digital representations of fingerprints as the identity credential. In this embodiment the identity credential verification subsystem 103 performs fingerprint image acquisition, and template generation, storage, and matching. The identity credential verification subsystem 103 may use the main processor 101 of the in-circuit security system 100 for credential processing actions or may use its own specialized processor. Similarly, it may employ its own memory for credential storage or use the main memory 102 of the in-circuit security system 100. The in-circuit security system 100 provides one or more connections 110 to external components for credential sensing, such as a fingerprint sensor.

The in-circuit security system 100 incorporates an interface 112 to a transceiver 107, antenna, wire, or other remote communication device that is coupled to the processor 101. This component is used for transmission of data from one device to another. All sensitive data that is to be transmitted from the in-circuit security system 100 can be encrypted using the cryptographic subsystem 104, so it is not necessary to place a transceiver 107 within the secure boundaries of the in-circuit security system 100. However, in some embodiments it may prove to be convenient to incorporate the transceiver 107 into the chip. In these embodiments the interface 112 would be from the transceiver to an antenna, wire, or other communication device. In a primary embodiment of the invention, the transmission technology is radio-frequency identification (RFID), such as the ISO 14443 A/B or 15693 standards. In another embodiment the in-circuit security system 100 uses Bluetooth or infrared technology. Other embodiments provide a combination of these technologies or others. In alternative embodiments, it may be useful to use a wired technology, such as a serial or USB connection. The in-circuit security system 100 preferably provides external connections 112 for requisite connectors, cables or antennae.

The authentication of individuals allows the in-circuit security system 100 to associate an individual with specific security privileges within the system. For example, one user may be enrolled and identified as a typical user with no ability to reset the system 100, while an alternate user may be identified as an administrator with that ability. Additionally, the in-circuit security system 100 may be programmed to perform a variety of both temporary and permanent responses to security events. For example, a specified number of access denials within a particular time interval may cause the in-circuit security system 100 to suspend all actions or halt the real-time clock 105 until reset by an enrolled administrator. Alternatively, an attempt to crack open the case of the chip housing the in-circuit security system 100 may result in permanent erasure of memory 102, or destruction of other components. The in-circuit security system 100 may also be programmed to allow an enrolled individual to directly disable or destroy components.

As described above, the in-circuit security system 100 is combined into one secured chip with three major interfaces: an interface to a credential sensing mechanism, such as a fingerprint sensor; an interface to peripheral components, such as non-secure processors or user-interface devices; and an interface to a transceiver or antenna for remote communications. Other interfaces are strictly prevented. The chip may use one or more physical security measures to prevent information eavesdropping. These obfuscation techniques include use of "potting", oxygen-reactive layers, photo-sensors, Hall effect sensors, and circuits that monitor clock frequency and/or reset frequency.

The system 100 may additionally perform algorithmic analysis of interface traffic. For example, fingerprint images received from a fingerprint sensor may be analyzed by the identity credential verification subsystem 103; if the identity credential verification subsystem 103 repeatedly receives the exact same bit pattern representation of fingerprints, it is possible that someone is deliberately placing that bit pattern on the interface. Similarly, if the identity credential verification subsystem 103 receives bit patterns that are an exact rotation or other permutation of a previously received image, again someone may be altering the contents of the interface.

Figure 2:
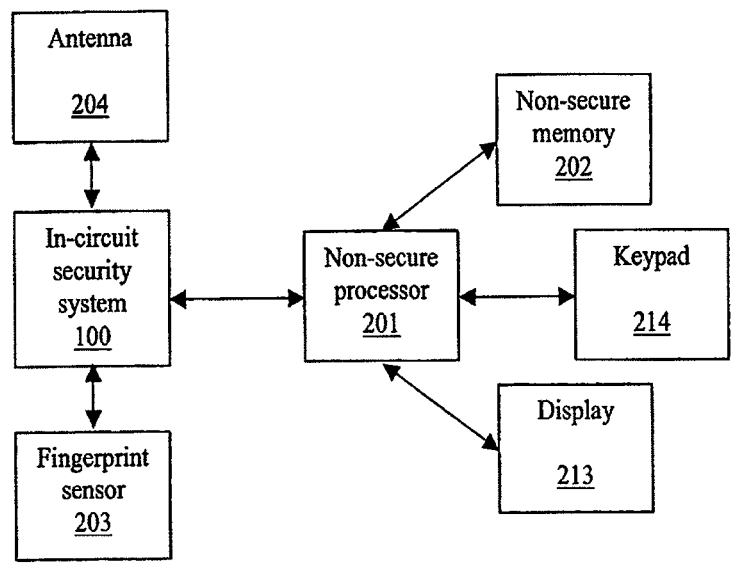
FIG. 2: Handheld computer with the in-circuit security system
  100 In-circuit security system
  201 Non-secure processor
  202 Non-secure memory
  203 Fingerprint sensor
  204 Antenna
  213 Display
  214 Keypad

The in-circuit security system can be used as a standalone component for security applications or as one of multiple components within an electronic device. In one use of the invention, a handheld computer is equipped with the in-circuit security system 100, as seen in FIG. 2. The computer further comprises a display 213, a keypad 214, a non-secure processor 201 and memory 202, and a fingerprint sensor 203. Additionally, for embodiments in which the in-circuit security system 100 includes a transceiver 107 that uses cellular wireless technology, the handheld computer also incorporates an antenna 204.

The primary user of the handheld computer enrolls a fingerprint, a digital certificate, and an associated private key into the in-circuit security system 100. The fingerprint is stored in the identity credential verification subsystem 103 and is used to authorize use of the private key associated with the digital certificate. The digital certificate may be stored in the cryptographic subsystem 104 or the main memory 102 of the in-circuit security system 100.

The individual typically uses the handheld computer to transmit and receive e-mail. He requires the in-circuit security system 100 to digitally sign his e-mail, which requires accessing the stored private key associated with his fingerprint. He selects his e-mail program, and types an e-mail for transmission using the keypad 214. The keypad 214 is coupled to the processor 201, which receives the data and creates an appropriate message packet for transmission. Once created, the message packet is sent to the in-circuit security system 100 for further processing.

The processor 101 of the in-circuit security system 100 receives the message packet and analyzes the established security settings for transmission of e-mail. Because the in-circuit security system 100 is configured to require digital signing of e-mail prior to transmission, the individual must first authenticate his fingerprint to the identity credential verification subsystem 103. The biometric authentication is required to prevent unauthorized users from encrypting e-mail with a private key that is not theirs. The processor 101 signals the identity credential verification subsystem 103 to wait for a new fingerprint sample from the fingerprint sensor 203, and signals the non-secure processor 201 to provide a visual prompt to the user on the display 213. After the user places his finger on the fingerprint sensor 203 it sends the new fingerprint image to the identity credential verification subsystem 103. The identity credential verification subsystem 103 analyzes the image, generates a template, and compares it to the enrolled fingerprint template. If the two match, the identity credential verification subsystem 103 sends a signal to the processor 101 that the individual is authorized to use the stored private key.

The processor 101 now sends the e-mail message to the cryptographic subsystem 104 and instructs the cryptographic subsystem 104 to sign the message. This typically involves generating a hash of the message and encrypting it with the private key. The cryptographic subsystem 104 may also include a timestamp generated by the real-time clock, the unique device identifier, or other data, prior to the hash. The cryptographic subsystem 104 now sends the signed e-mail message back to the processor 101. The processor 101, in turn, sends the signed e-mail to the cellular transceiver 107 for transmission to a remote recipient.

Figure 3:
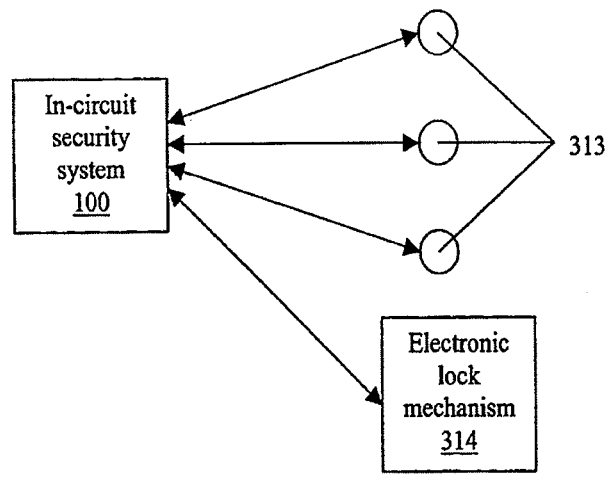
FIG. 3: Electronic lock mechanism with the in-circuit security system
  100 In-circuit security system
  313 LEDs
  314 Electronic lock mechanism

In a second embodiment of the invention, the in-circuit security system 100 is embedded into an electronic door locking mechanism that is used to control access to a secure facility. As seen in FIG. 3, the system comprises the in-circuit security system 100 with a wired connection to the electronic door lock 314, a fingerprint sensor 203, and a series of light emitting diodes (LEDs) 313 that are used to provide visual feedback to the user. Individuals access the secure facility by demonstrating enrollment of their fingerprint into the in-circuit security system 100. The security settings of the in-circuit security system 100 are configured to shut down the entire locking mechanism on a pre-specified number of failed attempts within a pre-specified time span. This is example of security parameters and settings that are stored within the memory 102.

An enrolled individual wishes to enter the facility. One LED 313 glows green, signaling that the fingerprint sensor 303 is ready. The individual places his finger on the sensor 203, which generates a fingerprint image and sends it to the identity credential verification subsystem 103. The identity credential verification subsystem 103 generates a fingerprint template and compares it to the enrolled fingerprints. The new fingerprint template matches an existing template, so the identity credential verification subsystem 103 sends the individual's unique identifier to the processor 101. The processor 101 accesses the memory 102, which stores security privileges associated with enrolled individuals. The individual who is currently authenticated is authorized to enter the secure facility alone, so the processor 101 sends a signal to the transceiver 107 to trigger the lock 314 to release.

Now an individual who has not been pre-enrolled into the identity credential verification subsystem 103 attempts to enter the secure facility. The individual places his finger on the fingerprint sensor 203, which sends an image of the fingerprint back to the identity credential verification subsystem 103. The fingerprint is compared to all of the enrolled fingerprints, and no match is found because the individual is not enrolled. The identity credential verification subsystem 103 records the date, time, and other requisite characteristics of the failed access attempt, and flashes a red LED 313 to show that access has been denied. The identity credential verification subsystem 103 also notifies the appropriate process within the processor 101 that an access failure has occurred.

The individual now tries another, un-enrolled finger. The identity credential verification subsystem 103 records the subsequent failure, and notifies the processor 101 that there has been another failure. When the number of failed attempts reaches the pre-established limit, the identity credential verification subsystem 103 again notifies the processor 101 that a failure has occurred. At this point, the processor 101 applies the security settings and places the electronic lock mechanism 314 in a state where it cannot be unlocked unless it is reset by a recognized authority; in a primary embodiment this would be implemented using a "fail-secure" lock and would involve disconnecting a power source. Alternative actions can occur to put the lock 314 into this state as necessary. The processor 101 may also put the identity credential verification subsystem 103 into a state where it does not accept new fingerprints, create images, or perform matching. As desired by the regulator of the secure facility, the processor 101 may instruct the identity credential verification subsystem 103 to delete any enrolled fingerprint images. These are all examples of programmable security settings.

While the description above refers to particular embodiments of the present invention, it will be understood that many modifications may be made without departing from the spirit thereof. The accompanying claims are intended to cover such modifications as would fall within the true scope and spirit of the present invention.

We claim:

1. An apparatus, comprising:
a single integrated circuit having
a first portion including an identity credential verification subsystem, the identity credential verification subsystem configured to identify a user based on a stored identity credential and to verify the user based on a security privilege associated with the stored identity credential,
a second portion associated with functionality of the single integrated circuit not used during operation of the identity credential verification subsystem, the second portion configured to be enabled when the identity credential verification subsystem has identified the user based on the stored identity credential and verified the user based on the security privilege associated with the identity credential, the second portion configured to be disabled when the identity credential verification subsystem has not at least one of (1) identified the user based on the stored identity credential, or (2) verified the user based on the security privilege associated with the stored identity credential,
a power source, and
a real-time clock configured to generate data when the second portion of the single integrated circuit is enabled and the real-time clock is operatively connected to the power source.

2. The apparatus of claim 1, wherein the identity credential verification subsystem is configured to be in electronic communication with a cryptographic subsystem of the single integrated circuit.

3. The apparatus of claim 1, wherein the single integrated circuit includes a cryptographic subsystem operatively coupled to the real-time clock, the cryptographic subsystem configured to perform at least one of encryption, decryption, digital signing, and digital signature verification.

4. The apparatus of claim 1, wherein the stored identity credential is a biometric template, the apparatus further comprising:
a biometric scanner configured to receive a biometric input from the user, the biometric scanner configured to send data associated with the received biometric input to the identity credential verification subsystem, the identity credential verification subsystem configured to determine whether the received biometric input matches the stored biometric template.

5. The apparatus of claim 1, wherein the security privilege associated with the stored identity credential includes a permission to at least one of selectively disable a component or selectively destroy a component of an electronic device that includes the single integrated circuit.

6. The apparatus of claim 1, wherein the security privilege associated with the stored identity credential includes a permission to selectively enable a disabled component.

7. The apparatus of claim 1, wherein the security privilege associated with the stored identity credential includes a permission to access stored data.

8. The apparatus of claim 1, wherein the single integrated circuit is included in an electronic device configured for electronic messaging, the security privilege associated with the stored identity credential includes a permission to encrypt an electronic message with a stored private key.

9. The apparatus of claim 8, wherein the single integrated circuit includes a processor and a cryptographic subsystem, the processor configured to receive a signal from the identity credential verification subsystem when the second portion of the single integrated circuit is enabled, the cryptographic subsystem configured to receive a signal from the processor and to encrypt the electronic message with the stored private key.

10. The apparatus of claim 1, wherein:
the user is a first user,
the stored identity credential is a first identity credential of a plurality of identity credentials stored within a memory of the single integrated circuit, the plurality of identity credentials including a second identity credential associated with a second user different from the first user,
the security privilege associated with the first identity credential is a first security privilege of a plurality of security privileges stored within the memory of the single integrated circuit, the plurality of security privileges including a second security privilege associated with the second identity credential, the second security privilege being different from the first security privilege.

11. The apparatus of claim 1, further comprising:
an electronic lock mechanism including the single integrated circuit, the single integrated circuit configured to send a signal configured to unlock the electronic lock mechanism when the second portion of the single integrated circuit is enabled and when the security privilege permits access to data or a location protected by the electronic lock mechanism.

12. The apparatus of claim 1, further comprising:
an electronic lock mechanism including the single integrated circuit, the single integrated circuit configured to send a signal configured to place the electronic lock mechanism in a state such that the electronic lock mechanism cannot be unlocked unless the electronic lock mechanism is reset by a recognized authority when the identity credential verification subsystem denies access for a predetermined number of access attempts within a predetermined time period.

13. The apparatus of claim 1, further comprising:
an electronic lock mechanism including the single integrated circuit,
the stored identity credential being a first identity credential, the single integrated circuit configured to place the electronic lock mechanism in a state such that the identity credential verification subsystem does not accept a second identity credential when the identity credential verification subsystem denies access based on the first identity credential.

14. An electronic device, comprising:
a single integrated circuit including
an identity credential verification subsystem configured to authenticate a biometric input of a user based on a pre-enrolled biometric template stored in a memory of the electronic device,
a power source,
a real-time clock operatively connected to the power source,
a processor operatively coupled to the real-time clock, the processor configured to deny access for a predetermined number of access attempts within a predetermined period of time based on failed authentication at the identity credential verification subsystem,
the single integrated circuit configured to disconnect the real-time clock from the power source when the access is denied by the processor.

15. The electronic device of claim 14, wherein the single integrated circuit is configured to produce a biometric digital representation based on the biometric input of the user, the identity credential verification subsystem is configured to compare the biometric digital representation with the pre-enrolled biometric template during authentication.

16. The electronic device of claim 14, wherein the single integrated circuit includes a cryptographic subsystem and a memory storing a private key, the identity credential verification subsystem configured to send a signal to the processor indicating that the user is authorized to use the stored private key when the biometric input of the user is authentic, the processor configured to send an electronic message associated with input from the user to the cryptographic subsystem, the cryptographic subsystem configured to encrypt the electronic message based on the stored private key.

17. The electronic device of claim 14, wherein the single integrated circuit includes a cryptographic subsystem configured to (1) receive an electronic message associated with input from the user from the processor, (2) encrypt the electronic message, and (3) send the encrypted electronic message to a transmitter of the electronic device for output to a recipient.

18. The electronic device of claim 14, wherein operation of the real-time clock is halted when the real-time clock is disconnected from the power source.

19. The electronic device of claim 14, wherein the electronic device is an electronic lock mechanism, the identity credential verification subsystem configured to send a signal to place the electronic lock mechanism in a state such that the electronic lock mechanism cannot be unlocked unless the electronic lock mechanism is reset by a recognized authority, the identity credential verification subsystem configured to send the signal when the identity credential verification subsystem denies access for a predetermined number of access attempts within a predetermined time period.

20. The electronic device of claim 14, wherein the biometric input is a first biometric input, the electronic device is an electronic lock mechanism having a first state in which the identity credential verification subsystem accepts the first biometric input, and a second state in which the identity credential verification subsystem does not accept a second biometric input when the identity credential verification subsystem denies access based on the first biometric input.

* * * * *